United States Patent
Myers et al.

(10) Patent No.: US 6,769,731 B1
(45) Date of Patent: Aug. 3, 2004

(54) CARGO COVER HAVING HINGED RAILS

(75) Inventors: Matthew J. Myers, Berkley, MI (US); Paul L. Yetter, Washington Towhship, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/429,754

(22) Filed: May 5, 2003

(51) Int. Cl.$^7$ ................................................ B60J 7/00
(52) U.S. Cl. ................................................ 296/100.09
(58) Field of Search .................. 296/55, 76, 100.02, 296/100.06, 100.08, 100.09, 100.1, 146.13; 105/377.04; 49/460

(56) References Cited

U.S. PATENT DOCUMENTS

| | | | |
|---|---|---|---|
| 4,261,611 A | * 4/1981 | Barry et al. | ............. 296/100.1 |
| 4,382,311 A | 5/1983 | Watts | ............................ 16/66 |
| 4,813,100 A | 3/1989 | King | ............................. 16/49 |
| 4,815,163 A | 3/1989 | Simmons | ........................ 16/49 |
| 4,925,830 A | 5/1990 | Walsh | ............................ 505/1 |
| 5,331,718 A | 7/1994 | Gilbert et al. | ................. 16/82 |
| 6,126,222 A | 10/2000 | Nguyen et al. | ............... 296/56 |
| 6,170,900 B1 | * 1/2001 | Kooiker | .................. 296/107.09 |
| 6,382,699 B1 | * 5/2002 | Hanson | ................. 296/100.09 |
| 2001/0035664 A1 | * 11/2001 | Steffens et al. | ........ 296/100.09 |

* cited by examiner

*Primary Examiner*—Lori L. Coletta
(74) *Attorney, Agent, or Firm*—Laura C. Hargitt

(57) ABSTRACT

A cargo cover is provided for a cargo compartment of a vehicle. The cargo cover includes first and second panels configured to cover the cargo compartment. Each panel has a top surface. First and second rails are mounted to the top surface of the first panel, and third and fourth rails are mounted to the top surface of the second panel. The first rail is pivotally connected to the third rail by a first hinge, and the second rail is pivotally connected to the third rail by a second hinge. The first panel is pivotable to a folded position over the second panel. In the folded position, the first rail rests against the third rail and the second rail rests against the fourth rail so that the top surfaces do not touch.

21 Claims, 5 Drawing Sheets

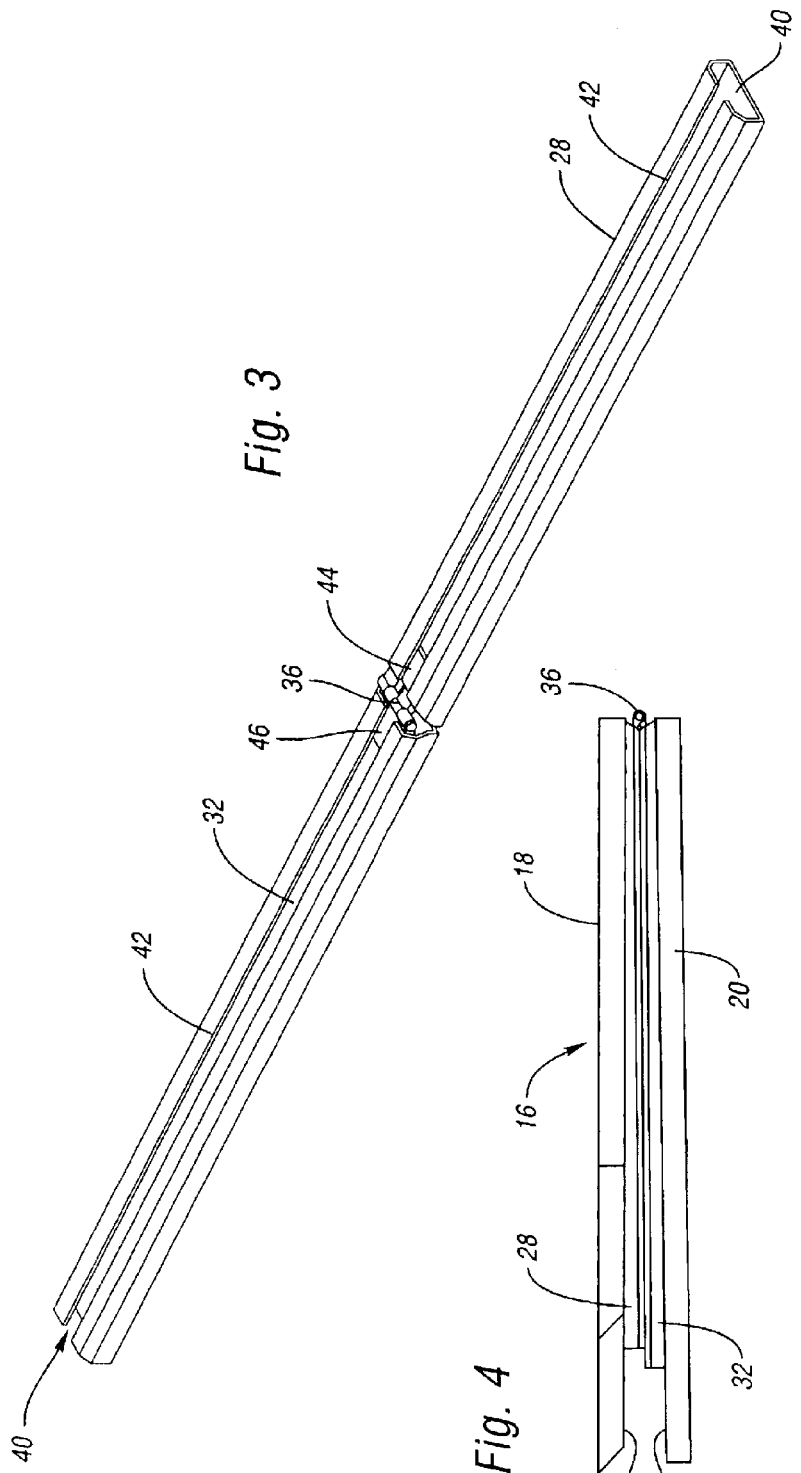

US 6,769,731 B1

CARGO COVER HAVING HINGED RAILS

TECHNICAL FIELD

The present invention relates to a cargo cover having rails positioned on a top surface of first and second panels, wherein the rails are hinged together so that the panels may be folded on top of each other without touching.

BACKGROUND OF THE INVENTION

It is known to provide a bed for a vehicle such as a pickup truck. Typically, the bed is rectangular in shape to define a cargo compartment and is closed at the end by a tailgate. The tailgate is hinged to the bed to have an upright position to close the end of the bed and a horizontal position to open the end of the bed.

Many of the pickup trucks sold today have a cargo cover (or tonneau cover) to cover the bed. The cover is typically made as a one-piece panel of a relatively strong and rigid material to comply with predetermined strength and performance specifications. The use of the one-piece panel may result in sacrificing the ability to haul tall objects without the forethought of removing the one-piece panel from the cargo compartment. This may preclude on-the-spot purchases of large objects to be hauled.

Multi-piece cargo covers are also available. These multi-piece foldable cargo covers are usually flat with a black or grey grained surface in order to prevent or hide any dents, dings or scratches which may occur when the covers are folded together to open the cargo compartment.

It is desirable to provide a styled, body color cargo cover which is foldable to enable hauling of tall objects in the cargo compartment.

SUMMARY OF THE INVENTION

The invention provides a foldable cargo cover including two panels connected by hinged rails positioned on a top surface of the panels. When the panels are folded together, the rails prevent the top surfaces of the cargo covers from contacting each other. Accordingly, the top surfaces will not be dented, dinged or scratched when folded, and the surfaces may be class "A", body color surfaces.

More specifically, a cargo cover is provided for a cargo compartment of a vehicle. The cargo cover includes first and second panels configured to cover the cargo compartment, wherein each panel has a top surface. First and second rails are mounted to the top surface of the first panel, and third and fourth rails are mounted to the top surface of the second panel. The first rail is pivotally connected to the third rail by a first hinge, and the second rail is pivotally-connected to the fourth rail by a second hinge.

The first panel is pivotable to a folded position over the second panel. In the folded position, the first rail rests against the third rail and the second rail rests against the fourth rail. The rails are configured so that the top surfaces of the first and second panels do not contact each other when in the folded position. The top surfaces may be curved (contoured) for styling and/or for water run-off.

The first, second, third and fourth rails each have an internal channel formed along the length thereof, and the first and second hinges are mounted inside the respective channels to partially hide the hinges from view. The first and second hinges pivot about an axis which is spaced above the top surfaces when the panels are in a closed position covering the cargo compartment.

The first and second panels are separated by a split, and the rails extend in a direction perpendicular to the split.

The first, second, third and fourth rails are configured as substantially C-shaped channel rails to receive aftermarket rack mount devices for mounting bicycles, skis, and the like. Preferably, the rails are extruded aluminum, but may comprise any feasible material.

First and second gas struts are connected to the first panel to provide an assist force for pivoting the first panel. The first and second gas struts are removable so that the first panel may be pivoted on top of the second panel. A release mechanism is operatively connected to the second panel to enable pivoting of the second panel to an upright position with the first panel. Third and fourth gas struts are connected to the second panel to provide an assist force for pivoting the first and second panels to the upright position.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 3 shows an enlarged perspective view of rails on the cargo cover of FIGS. 1 and 2;

FIG. 4 shows a side view of the cargo cover of FIGS. 1 and 2 in a folded position;

FIG. 5 shows an end view of the folded cargo cover of FIG. 4, with the curvature of the panels exaggerated;

DESCRIPTION OF THE PREFERRED EMBODIMENTS

Figure 1:
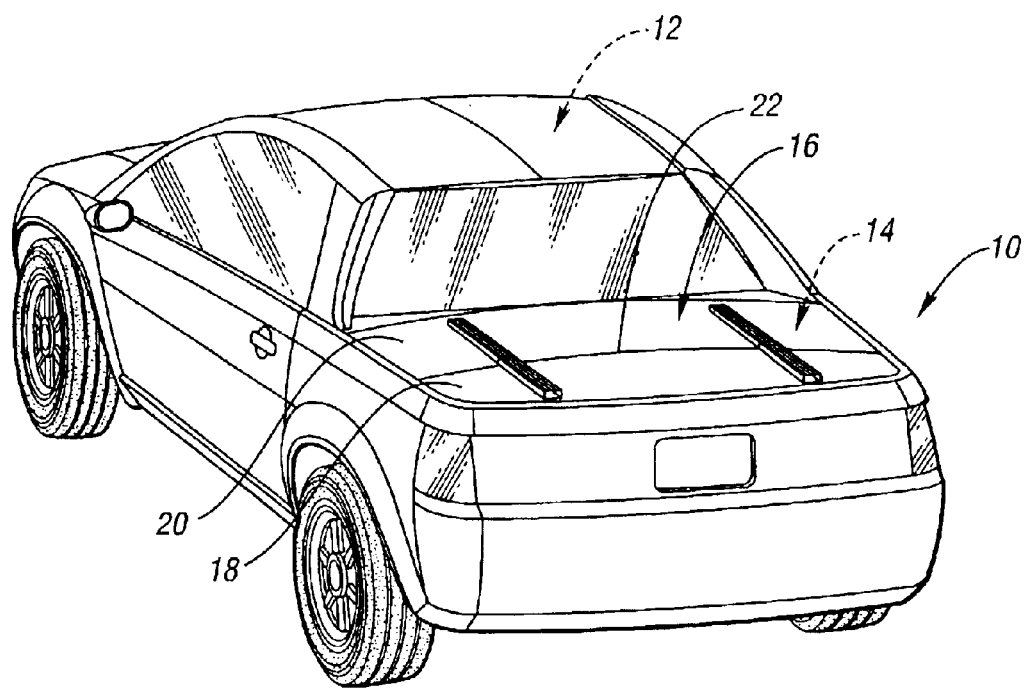
FIG. 1 shows a rear perspective view of a vehicle body incorporating a cargo cover in accordance with the invention.

Referring to FIG. 1, a vehicle 10 is shown having a cab portion 12 for carrying passengers, and a rear cargo compartment 14 for carrying cargo. The rear cargo compartment 14 is covered by a cargo cover 16. The cargo cover 16 includes first and second panels 18, 20 separated by a split 22.

Figure 2:
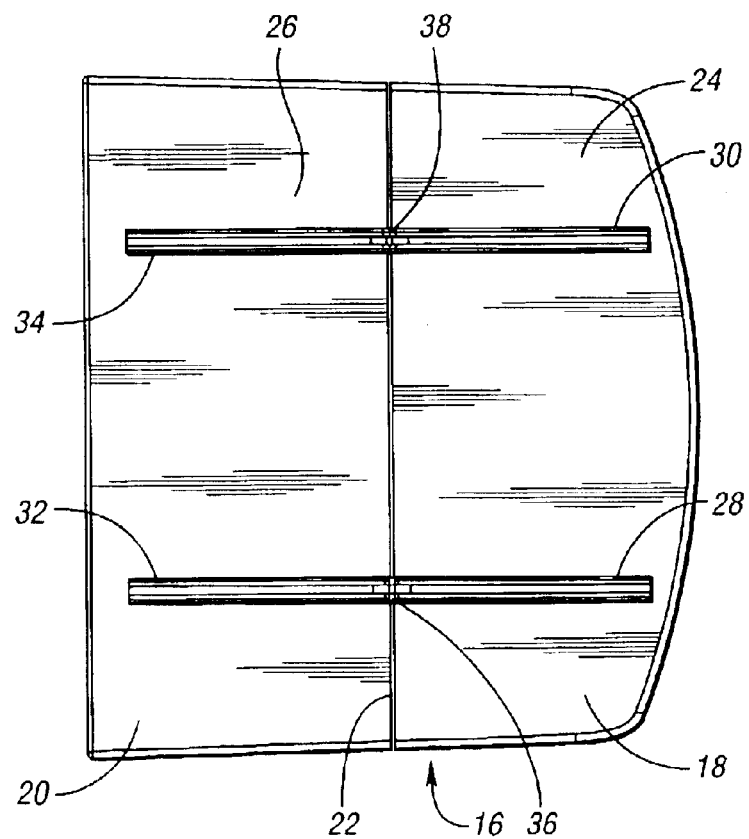
FIG. 2 shows a plan view of the cargo cover of FIG. 1.

Referring to FIG. 2, the first and second panels, 18, 20 each include a top surface 24, 26. First and second rails 28, 30 are mounted to the top surface 24 of the first panel 18. Third and fourth rails 32, 34 are mounted to the top surface 26 of the second panel 20. The first rail 28 is pivotally connected to the third rail 32 by the first hinge 36, and the second rail 30 is pivotally connected to the fourth rail 34 by the second hinge 38. The first and second rails 28, 30 are parallel, and the third and fourth rails 32, 34 are parallel.

FIG. 3 shows an enlarged view of the first rail 28, third rail 32 and hinge 36. As shown, the rails are generally C-shaped in vertical cross-section to form an open channel 40 with a slot 42 extending the length of the rails. As shown, the hinge 36 includes first and second mounting brackets 44, 46 which are mounted inside the channel 40 to partially hide the hinge 36 from view. The brackets may be mounted by screws, bolts, rivets, etc.

FIG. 4 shows a side view of a folded configuration of the cargo cover 16 in which the first panel 18 is folded on top of the second panel 20. As shown, the rails 28, 32 rest against each other (as do rails 30, 34), and may lock together, when the cargo cover 16 is in the folded position. The rails prevent the top surfaces 24, 26 of the respective first and second panels 18, 20 from contacting each other. Accordingly, the top surfaces 24, 26 will not be scratched or dented when the cargo cover 16 is folded to the position shown FIG. 4.

FIG. 5 shows an end view of the folded cargo cover of FIG. 4. The first and second panels 18, 20 are curved or contoured as shown for styling or water run-off. This curvature is slightly exaggerated in FIG. 5. As shown in FIG. 5, the rails 28, 30, 32, 34 and hinges 36, 38 are configured so that no portion of the top surface 24 of the first panel 18 contacts the top surface of the second panel 20 when in the folded position.

Figure 6:
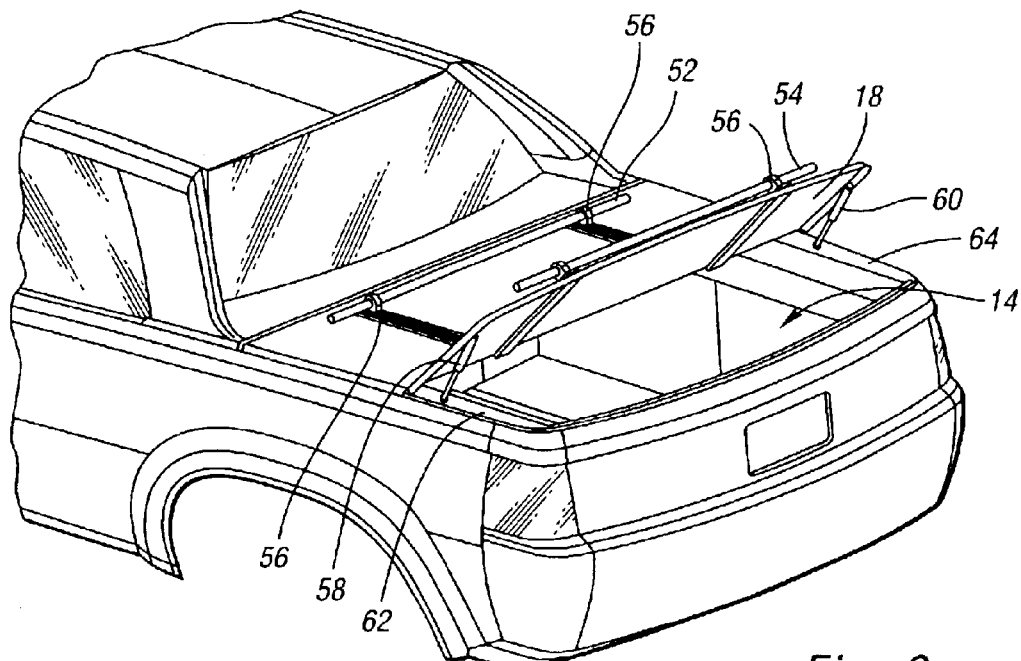
FIG. 6 shows a rear perspective view of the vehicle of FIG. 1 with the first panel pivoted to an open position.

FIGS. 5 and 6 also demonstrate that the pivot axis 50 of the first and second hinges 36, 38 is spaced away from the top surfaces 24, 26 of the panels 18, 20 so that the surfaces 24, 26 do not touch when the panels are folded together. Therefore, the surfaces 24, 26 may be class "A" surfaces. The class "A" surfaces may be body color, molded, grained, soft fabric, or any other desired material or appearance for aesthetic purposes.

The rails 28, 30, 32, 34 are preferably extruded aluminum, but they may be plastic, steel, composite, or any other desired material.

Referring to FIG. 6, aftermarket racks 52 may be mounted to the rails 28, 30, 32, 34 via stanchions 56 which are supported within the rail channels. Also, gas struts 58, 60 may be positioned between the first panel 18 and the sidewalls 62, 64 of the rear cargo compartment 14 to provide an assist force in raising the first panel 18 to the open position shown in FIG. 6. Sample gas struts are disclosed in U.S. Pat. Nos. 4,382,311; 4,813,100, 4,815,163; 4,925,830; 5,331,718; and 6,126,222, each of which is hereby incorporated by reference in its entirety.

Figure 7:
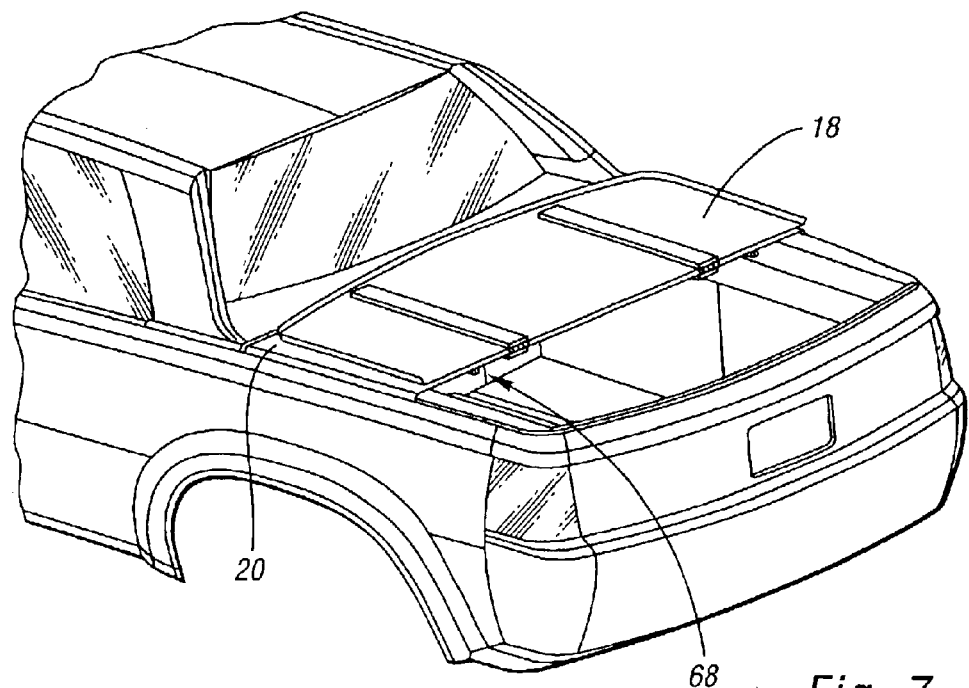
FIG. 7 shows a rear perspective view of the vehicle of FIG. 6 with the first panel pivoted to a folded position over the second panel.

The first and second gas struts 58, 60 may be removable to allow the first panel 18 to pivot to the folded position on top of the second panel 20, as shown in FIG. 7 The removable aspect of the gas struts may be achieved by removable lock pins in cooperation with brackets, or by other simple locking or latching mechanisms.

Figure 8:
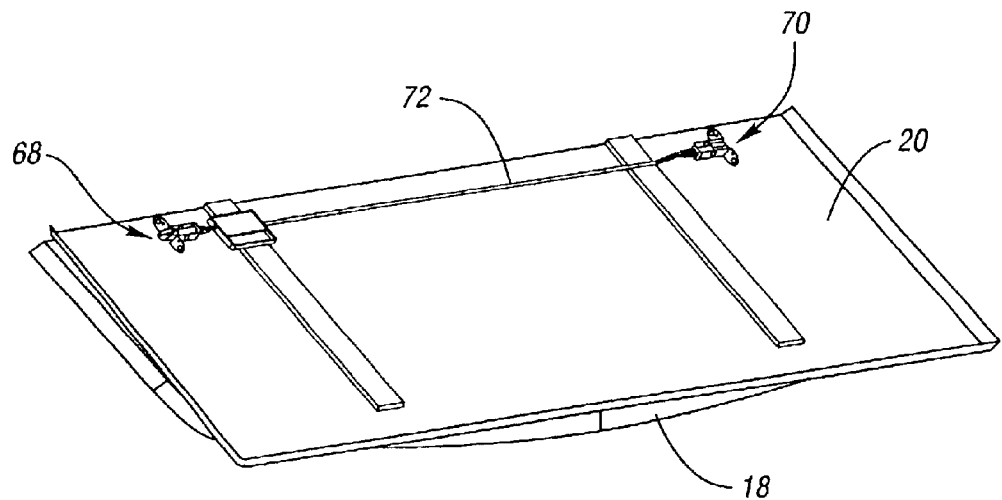
FIG. 8 shows an underside perspective view of the panel and release handle of FIG. 7, with the panels flipped upside down.
Figure 9:
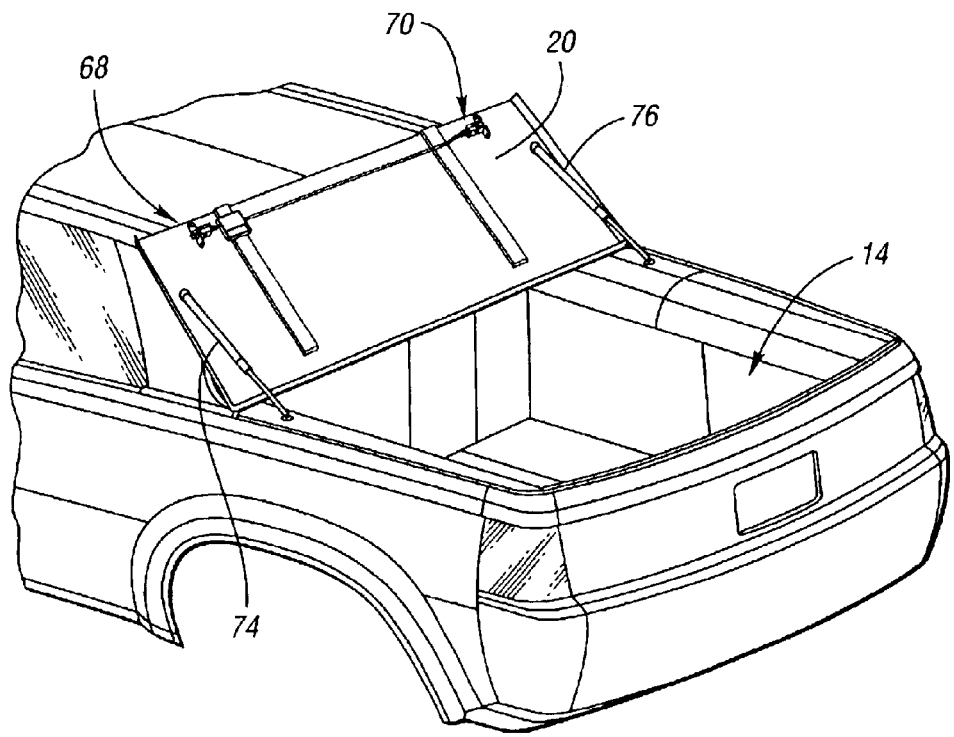
FIG. 9 shows a rear perspective view of the vehicle of FIG. 7 with the first and second panels folded to an upright position.

FIGS. 7 and 8 also illustrate a release mechanism 68 (which is preferably a compression latch) which allows an operator to release the second panel 20 from the sidewalls 62, 64 of the cargo compartment 14 to pivot the panels to the upright position shown in FIG. 9. As shown in FIG. 8, a second release mechanism is positioned at the opposing end of the second panel 20. The release mechanisms 68, 70 are interconnected by a cable 72 so that the mechanisms 68, 70 may be released simultaneously.

FIG. 9 shows the first and second panels 18, 20 pivoted to the upright position, and supported by the third and fourth gas struts 74, 76. The gas struts 74, 76 provide an assist force to assist the user in pivoting the first and second panels 28, 20 from the folded position shown in FIG. 7 to the upright position shown in FIG. 9. In this configuration, approximately 90% of the usable cargo space of the rear cargo compartment 14 is available. Accordingly, a user need not have the forethought to remove the cargo cover from the rear cargo compartment 14 prior to a trip in which a tall cargo item will be stored in the rear cargo compartment 14.

Accordingly, the invention enables the cargo cover to have a wide variety of aesthetic styling features, shapes or curvatures while still allowing the panels to fold on top of each other without damage. The first panel 18 can be easily articulated to the open position shown in FIG. 6 as a result of the gas strut assistance. This provides an enclosed area within the rear cargo compartment 14 which is dry, secure and easily accessible. When the customer chooses to haul large objects and wishes to articulate the cargo cover out of the way, the above described sequence is used. First, the gas struts 58, 60 are removed and the first panel 18 is folded on top of the second panel 20. One of the release handles 68, 70 is then pulled on the underside of the second panel 20 and both panels are free to rotate up and lock vertically behind the rear window of the vehicle as shown in FIG. 9.

Figure 10:
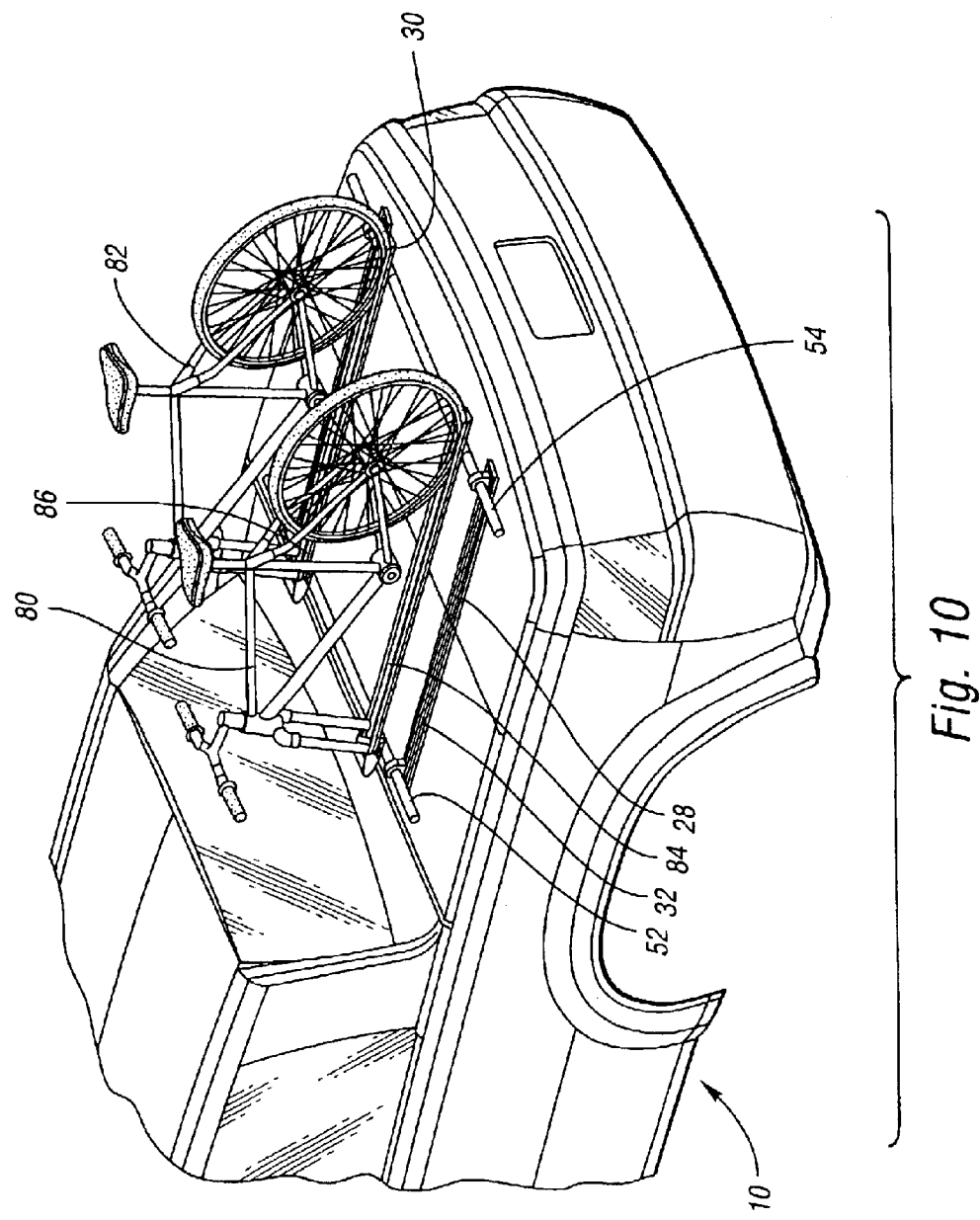
FIG. 10 shows a rear perspective view of the vehicle of FIG. 1 with an aftermarket bicycle rack mounted to the rails with bicycles thereon.

Also, the rails allow secondary storage of aftermarket rail carrier systems for specific needs, such as for storing skis, snowboards, bicycles, or the like. FIG. 10 shows the vehicle 10 having aftermarket racks 52, 54 mounted on the rails 28, 30, 32, 34, with two bicycles 80, 82 supported thereon via the bicycle rack structures 84, 86.

Many current vehicles have carrier rails on their roofs. With the present invention, the rails are positioned at a lower height which makes it significantly easier for many customers to reach over and load or remove articles, such as the bicycles shown in FIG. 10.

While the best mode for carrying out the invention has been described in detail, those familiar with the art to which this invention relates will recognize various alternative designs and embodiments for practicing the invention within the scope of the appended claims.

What is claimed is:

1. A cargo cover for a cargo compartment of a vehicle, comprising:
    first and second panels configured to cover the cargo compartment, said panels each having a top surface;
    first and second rails mounted to the top surface of the first panel, and third and fourth rails mounted to the top surface of the second panel;
    wherein the first rail is pivotally connected to the third rail by a first hinge, and the second rail is pivotally connected to the fourth rail by a second hinge; and
    wherein the first panel is pivotable to a folded position over the second panel, and in said folded position the first rail rests against the third rail and the second rail rests against the fourth rail.

2. The cargo cover of claim 1, wherein said top surfaces are curved.

3. The cargo cover of claim 2, wherein said rails are configured so that said top surfaces do not contact each other when in said folded position.

4. The cargo cover of claim 1, wherein said first, second, third and fourth rails each have an internal channel formed along the length thereof, and said first and second hinges are mounted inside the respective channels to partially hide the hinges from view.

5. The cargo cover of claim 1, wherein said first and second hinges pivot about an axis which is spaced above said top surfaces when the panels are in a closed position covering the cargo compartment.

6. The cargo covers of claim 1, wherein said first and second panels are separated by a split, and said rails extend perpendicular to the split.

7. The cargo cover of claim 1, wherein said first, second, third and fourth rails are configured as substantially C-shaped channel rails to receive rack mount devices.

8. The cargo cover of claim 1, wherein said rails comprise extruded aluminum.

9. The cargo cover of claim 1, further comprising first and second gas struts connected to the first panel to provide an assist force for pivoting the first panel.

10. The cargo cover of claim 9, wherein said first and second gas struts are removable and further comprising a release mechanism operatively connected to the second panel to enable pivoting of the second panel to an upright position with the first panel.

11. The cargo cover of claim 10, further comprising third and fourth gas struts connected to the second panel to provide an assist force for pivoting the first and second panels to said upright position.

12. A cargo cover for a cargo compartment of a vehicle, comprising:

first and second panels configured to cover the cargo compartment, said panels each having a top surface;

first and second rails mounted to the top surface of the first panel, and third and fourth rails mounted to the top surface of the second panel;

wherein the first rail is pivotally connected to the third rail by a first hinge, and the second rail is pivotally connected to the fourth rail by a second hinge; and wherein said first, second, third and fourth rails each have an internal channel along the length thereof, and said first and second hinges are mounted inside the respective channels to partially hide the hinges from view.

13. The cargo cover of claim 12, wherein the first panel is pivotable to a folded position over the second panel, and in said folded position the first rail rests against the third rail and the second rail rests against the fourth rail.

14. The cargo cover of claim 12, wherein said top surfaces are curved.

15. The cargo cover of claim 14, wherein said rails and panels are configured so that said top surfaces do not contact each other when in said folded position.

16. The cargo cover of claim 12, wherein said first and second hinges pivot about an axis which is spaced above said top surfaces when the panels are in a closed position covering the cargo compartment.

17. The cargo covers of claim 12, wherein said first and second panels are separated by a split, and said rails extend perpendicular to the split.

18. The cargo cover of claim 12, wherein said first, second, third and fourth rails are configured as substantially C-shaped channel rails to receive rack mount devices.

19. The cargo cover of claim 12, wherein said rails comprise extruded aluminum.

20. The cargo cover of claim 12, further comprising:

first and second gas struts connected to the first panel to provide an assist force for pivoting the first panel, said gas struts being removable;

a release mechanism operatively connected to the second panel to enable pivoting of the second panel to an upright position with the first panel; and third and fourth gas struts connected to the second panel to provide an assist force for pivoting the first and second panels to said upright position.

21. A cargo cover for a cargo compartment of a vehicle, comprising:

first and second panels configured to cover the cargo compartment, said panels each having a curved top surface;

first and second rails mounted to the top surface of the first panel, and third and fourth rails mounted to the top surface of the second panel;

wherein the first rail is pivotally connected to the third rail by a first hinge, and the second rail is pivotally connected to the fourth rail by a second hinge;

wherein the first panel is pivotable to a folded position over the second panel, and in said folded position the first rail rests against the third rail and the second rail rests against the fourth rail;

said rails being configured so that said top surfaces do not contact each other when in said folded position; and wherein said first, second, third and fourth rails each have an internal channel formed along the length thereof, and said first and second hinges are mounted inside the respective channels to partially hide the hinges from view.

* * * * *